United States Patent
Sun et al.

(10) Patent No.: US 12,308,921 B2
(45) Date of Patent: May 20, 2025

(54) GROUP BASED BEAM REPORTING ENHANCEMENT FOR L1-RSRP AND L1-SINR

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Jie Cui, San Jose, CA (US); Sigen Ye, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/754,462

(22) PCT Filed: Apr. 6, 2021

(86) PCT No.: PCT/CN2021/085729
§ 371 (c)(1),
(2) Date: Apr. 1, 2022

(87) PCT Pub. No.: WO2022/213286
PCT Pub. Date: Oct. 13, 2022

(65) Prior Publication Data
US 2024/0072868 A1    Feb. 29, 2024

(51) Int. Cl.
*H04B 7/06*   (2006.01)
*H04L 5/00*   (2006.01)

(52) U.S. Cl.
CPC .......... *H04B 7/0639* (2013.01); *H04B 7/063* (2013.01); *H04L 5/0048* (2013.01)

(58) Field of Classification Search
CPC ...... H04B 7/0639; H04B 7/063; H04B 7/024; H04L 5/0048
See application file for complete search history.

(56) References Cited

FOREIGN PATENT DOCUMENTS

| CN | 108540995 | 9/2018 |
|---|---|---|
| CN | 111200872 | 5/2020 |

(Continued)

OTHER PUBLICATIONS

ZTE, "CSI enhancements for Multi-TRP and FR1 FDD reciprocity", 3GPP TSG RAN WG1 #104-e, R1-2100291, Feb. 5, 2021, 15 sheets.

*Primary Examiner* — Chi H Pham
*Assistant Examiner* — Samuel Dilan Rutnam
(74) *Attorney, Agent, or Firm* — Fay Kaplun & Marcin, LLP

(57) ABSTRACT

A base station configures a user equipment (UE) to perform measurements. The base station configures the UE for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, wherein the UE is further configured to select a first beam from the first plurality of beamformed RS and a second beam from the second plurality of beamformed RS and receives the at least one CSI measurement report comprising measurements for the first beam and the second beam.

17 Claims, 7 Drawing Sheets

(56) References Cited

FOREIGN PATENT DOCUMENTS

| CN | 114731193 A | * | 7/2022 | ........... H04B 17/318 |
|---|---|---|---|---|
| WO | 2020/061852 | | 4/2020 | |
| WO | WO-2020061852 A1 | * | 4/2020 | ........... H04B 17/327 |
| WO | WO-2021162517 A1 | * | 8/2021 | ........... H04B 17/318 |

* cited by examiner gNB RS transmission and configuration

UE group based beam reporting

| RS1 | RS3 | Allowed |
| RS1 | RS6 | Allowed |
| RS3 | RS7 | Allowed |
| RS1 | RS2 | Note |

UE group based beam reporting

| RS1 RS3 | RS5 RS7 | Allowed |
| RS3 RS4 | RS2 RS6 | Allowed |
| RS1 RS3 | RS2 RS5 | Note Allowed |

GROUP BASED BEAM REPORTING ENHANCEMENT FOR L1-RSRP AND L1-SINR

BACKGROUND INFORMATION

A user equipment (UE) may establish a connection to at least one of multiple different networks or types of networks. Signaling between the UE and the network may be achieved via beamforming. Beamforming is an antenna technique used to transmit a directional signal which may be referred to as a beam.

A base station of the network may be configured with multiple transmission reception points (TRPs) each configured to perform beamforming. For example, the base station may transmit a first beam from a first TRP to the UE and a second beam from a second TRP to the UE. The UE may be configured to measure a plurality of beamformed reference signals (RS) sent simultaneously from each of the TRPs and select a pair of RS, e.g., a first beamformed RS and a second beamformed RS, to report the network in a channel state information (CSI) report. However, as currently specified, the CSI report may not differentiate which of the reported RS were sent from the first TRP and which were sent from the second TRP.

SUMMARY

Some exemplary embodiments are related to a processor of a base station configured to perform operations. The operations include configuring a user equipment (UE) for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, wherein the UE is further configured to select a first beam from the first plurality of beamformed RS and a second beam from the second plurality of beamformed RS and receiving the at least one CSI measurement report comprising measurements for the first beam and the second beam.

Other exemplary embodiments are related to a base station having a transceiver configured to communicate with a user equipment (UE) and a processor communicatively coupled to the transceiver and configured to perform operations. The operations include configuring the UE for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, wherein the UE is further configured to select a first beam from the first plurality of beamformed RS and a second beam from the second plurality of beamformed RS and receiving the at least one CSI measurement report comprising measurements for the first beam and the second beam.

Still further exemplary embodiments are related to a processor of a user equipment (UE) configured to perform operations. The operations include receiving a configuration from a base station for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, selecting a first beam from the first plurality of beamformed RS and a second beam from the second plurality of beamformed RS and transmitting the at least one CSI measurement report comprising measurements for the first and second beam.

Additional exemplary embodiments are related to a user equipment (UE) having a transceiver configured to communicate with a base station and a processor communicatively coupled to the transceiver and configured to perform operations. operations include receiving a configuration from the base station for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, selecting a first beam from the first plurality of beamformed RS and a second beam from the second plurality of beamformed RS and transmitting the at least one CSI measurement report comprising measurements for the first and the second beam.

DETAILED DESCRIPTION

Figure 1:
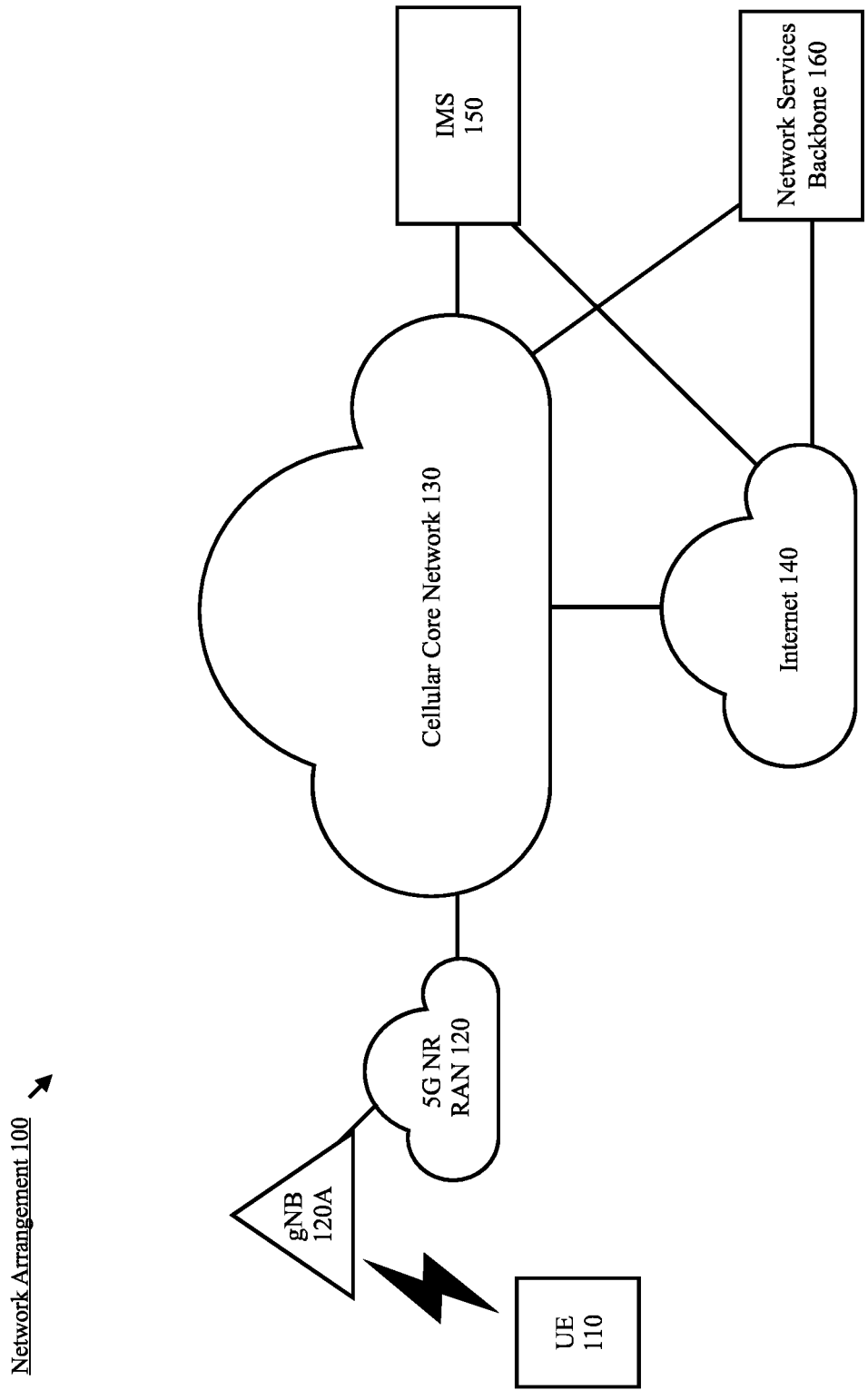
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to channel state information (CSI) measurement and reporting operations for a user equipment (UE) in multi-transmission reception point (TRP) operation.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary embodiments are also described with regard to a 5G New Radio (NR) network. However, reference to a 5G NR network is merely provided for illustrative purposes. The exemplary embodiments may be utilized with any network that utilizes beamforming. Therefore, the 5G NR network as described herein may represent any type of network that implements beamforming.

A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a "beam" or a "transmitter beam." The transmitter beam may be generated by having a plurality of antenna elements radiate the same signal. Increasing the number of antenna elements radiating the signal decreases the width of the radiation pattern and increases the gain. Thus, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a "beam" or a "receiver beam." The receiver beam may be generated by configuring the parameters of a spatial filter on a receiver antenna array to listen in a direction of interest and filter out any noise from outside the direction of interest. Like a transmitter beam, a receiver beam may also vary in width and be directed in any of a plurality of different areas of interest.

In addition, the exemplary embodiments are described with regard to a next generation node B (gNB) that is configured with multiple TRPs. Throughout this description, a TRP generally refers to a set of components configured to transmit and/or receive a beam. In some embodiments, multiple TRPs may be deployed locally at the gNB. For example, the gNB may include multiple antenna arrays/panels that are each configured to generate a different beam. In other embodiments, multiple TRPs may be deployed at various different locations and connected to the gNB via a backhaul connection. For example, multiple small cells may be deployed at different locations and connected to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a beam.

The exemplary embodiments relate to operations to configure the UE with multiple reference signal (RS) resources, wherein each RS resource is associated with one TRP. The RS resources may include a channel measurement resource (CMR), a zero-power interference measurement resource (ZP-IMR) or a non-zero-power interference measurement resource (NZP-IMR) for each of the TRPs. The UE may be further configured to select one beamformed RS transmitted from each of the TRPs on their respective RS resources and report the selected RS to the network as a pair, e.g., group based reporting.

In some embodiments, the TRP is indicated implicitly in a single CSI-ReportConfig, e.g., by configuring separate lists of RS resources for the UE, each list corresponding to a different TRP. In other embodiments, the TRP is indicated explicitly, e.g., in a TRP index. Various restrictions may be imposed for the configuration of the IMRs and for the interference testing behavior with respect to the configured RS resources.

In other embodiments, multiple CSI-ReportConfig may be used containing independent CMR and IMR configurations for each of the TRPs, wherein the CSI-ReportConfig for each of the TRPs are associated together either explicitly or implicitly. In still other embodiments, operations are described for multi-TRP operation in which one or more of the TRPs uses multiple panels for transmitting respective groups of RS. The exemplary techniques described herein may be used in conjunction with currently implemented beam management mechanisms, future implementations of beam management mechanisms or independently from other beam management mechanisms.

Network/Devices

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a base station 120A that represents a gNB that is configured with multiple TRPs. Each TRP may represent one or more components configured to transmit and/or receive a beam. In some embodiments, multiple TRPs may be deployed locally at the base station 120A. In other embodiments, multiple TRPs may be distributed at different locations and connected to the gNB.

Figure 2:
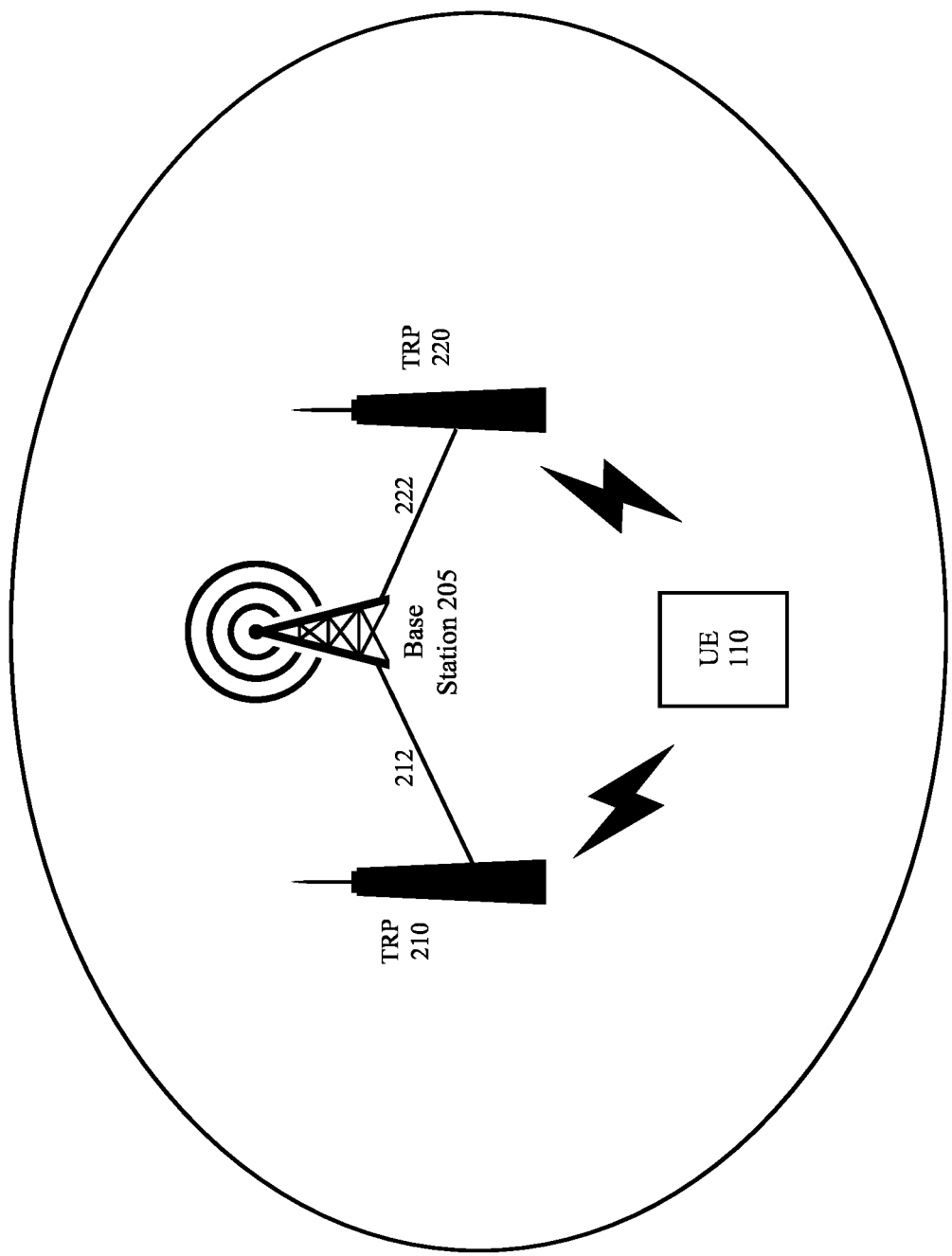
FIG. 2 shows an example of multiple transmission reception points (TRPs) deployed at different locations.

FIG. 2 shows an example of multiple TRPs deployed at different locations. In this example, the base station 205 is configured with a first TRP 210 via a backhaul connection 212 and a second TRP 220 via backhaul connection 222. Each of the TRPs 210, 220 may transmit a beam to and/or receive a beam from the UE 110. However, the base station 205 may be configured to control the TRPs 210, 220 and perform operations such as, but not limited to, assigning resources, configuring group pairs, configuring reporting restrictions, implementing beam management techniques, etc.

The example shown in FIG. 2 is not intended to limit the exemplary embodiments in any way. Those skilled in the art will understand that 5G NR TRPs are adaptable to a wide variety of different conditions and deployment scenarios. An actual network arrangement may include any number of different types of base stations and/or TRPs being deployed by any number of RANs in any appropriate arrangement. Thus, the example of a single base station 120A in FIG. 1 and a single base station 205 with two TRPs 210, 220 in FIG. 2 is merely provided for illustrative purposes.

Returning to the network arrangement 100 of FIG. 1, the base station 120A may include one or more communication interfaces to exchange data and/or information with UEs, the corresponding RAN, the cellular core network 130, the internet 140, etc. Further, the base station 120A may include a processor configured to perform various operations. For example, the processor of the base station 120A may be configured to perform operations related to access barring. However, reference to a processor is merely for illustrative purposes. The operations of the base station 120A may also be represented as a separate incorporated component of the base station 120A or may be a modular component coupled to the base station 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a base station.

The UE 110 may connect to the 5G NR-RAN 120 via the base station 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the base station 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
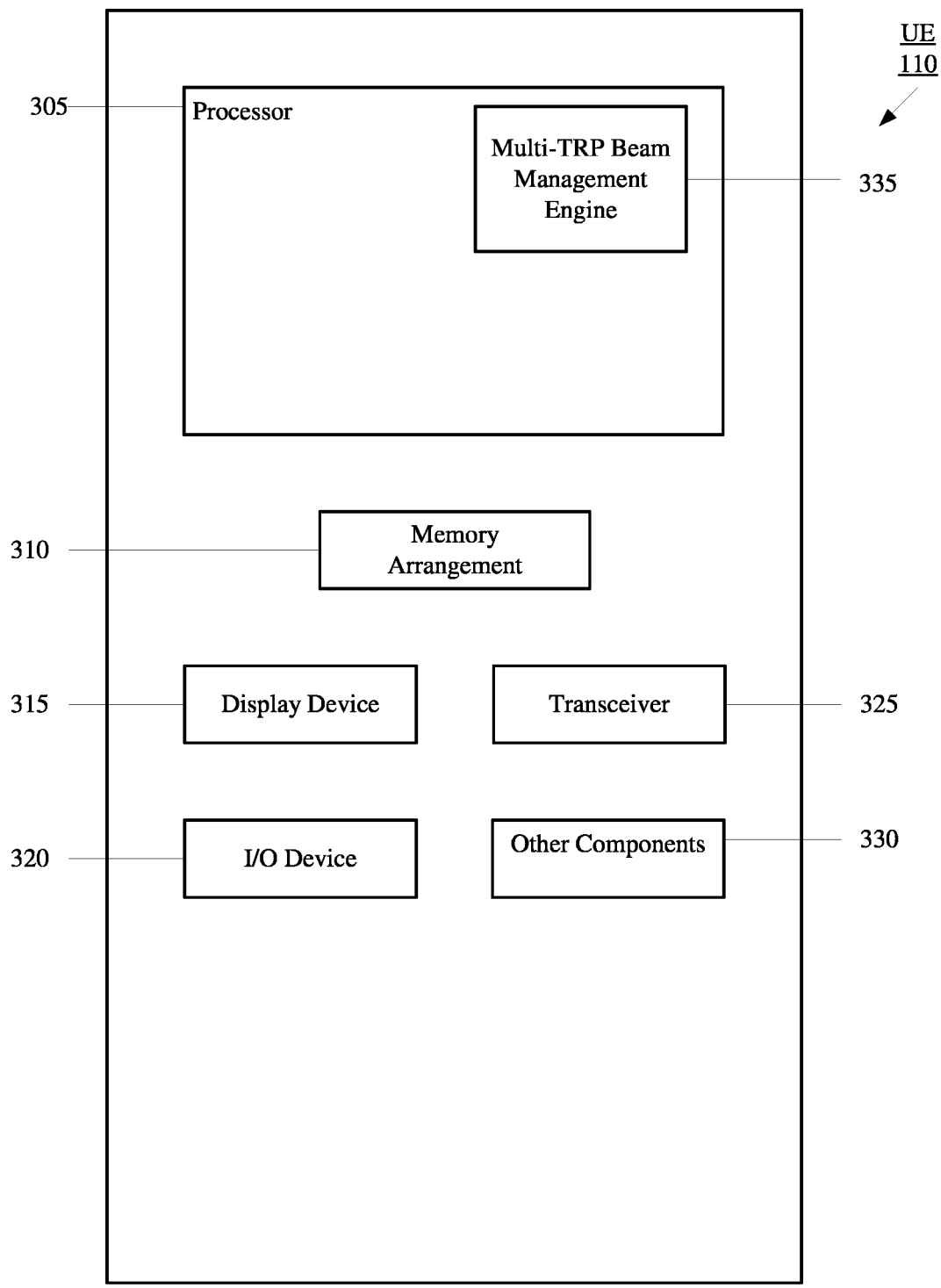
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a multi-TRP beam management engine 335. The multi-TRP beam management engine 335 may be configured to perform operations related to beam management such as, collecting measurement data, beam selection, and group based beam reporting of beams for the multiple TRPs.

The above referenced engine being an application (e.g., a program) executed by the processor 305 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 8:
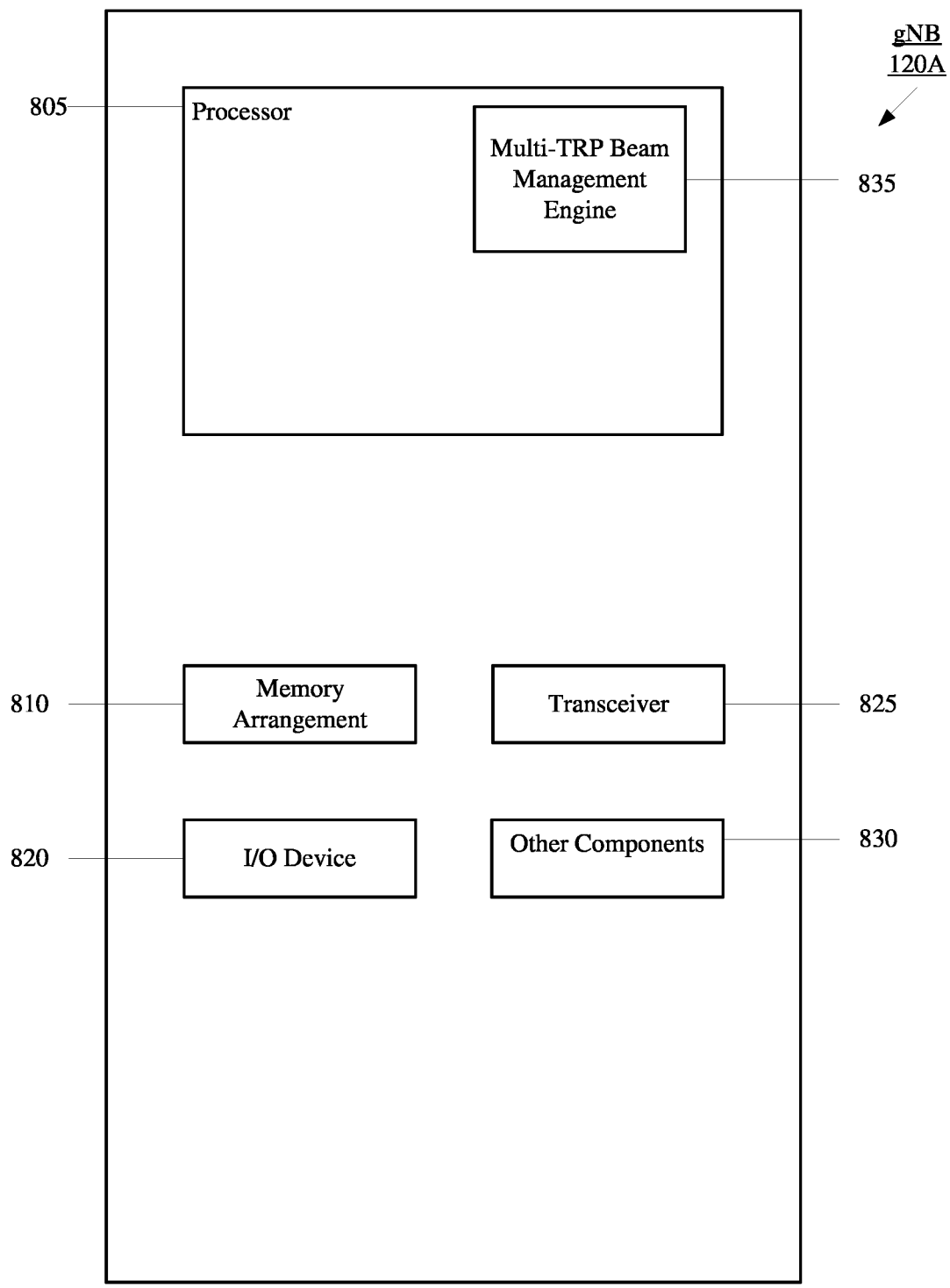
FIG. 8 shows an exemplary base station according to various exemplary embodiments.

FIG. 8 shows an exemplary base station, in this case gNB 120A, according to various exemplary embodiments. As noted above with regard to the UE 110, the gNB 120A may represent a cell in a multi-TRP configuration with the UE 110. The gNB 120A may represent any access node of the 5G NR network through which the UE 110 may establish a connection and manage network operations.

The gNB 120A may include a processor 805, a memory arrangement 810, an input/output (I/O) device 820, a transceiver 825, and other components 830. The other components 830 may include, for example, an audio input device, an audio output device, a battery, a data acquisition device, ports to electrically connect the gNB 120A to other electronic devices, etc.

The processor 805 may be configured to execute a plurality of engines of the gNB 120A. For example, the engines may include a multi-TRP beam management engine 835. The multi-TRP beam management engine 835 may be configured to perform operations related to beam management such as configuring a UE with measurement information and receiving measurement reports from the UE.

The above noted engines each being an application (e.g., a program) executed by the processor 805 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 805 is split among a plurality of processors (e.g., a baseband processor, an applications processor, etc.). The exemplary embodiments may be implemented in any of these or other configurations of a gNB.

The memory 810 may be a hardware component configured to store data related to operations performed by the UE 110. The I/O device 820 may be a hardware component or ports that enable a user to interact with the gNB 120A. The transceiver 825 may be a hardware component configured to exchange data with the UE 110 and any other UE in the system 100, e.g., if the gNB 120A serves as a PCell or an SCell to the UE 110. The transceiver 825 may operate on a variety of different frequencies or channels (e.g., set of consecutive frequencies). Therefore, the transceiver 825 may include one or more components (e.g., radios) to enable the data exchange with the various networks and UEs.

Group Based Beam Reporting

A reference signal received power (RSRP) may be determined for layer 1 (L1) (physical layer). An L1-RSRP measurement may be determined from RS measurements including a system synchronization block (SSB) (PBCH-DMRS) (SS-RSRP) or a channel state information (CSI) reference signal (CSI-RS) (CSI-RSRP). An L1 signal-to-noise and interference (SINR) ratio may also be determined from RS measurements including CSI-RS or SSB as channel measurement resources (CMR) and/or interference measurement resources (IMR).

Multiple transmission and reception point (multi-TRP) functionality involves a user equipment (UE) maintaining multiple links with multiple TRPs (e.g., multiple gNBs) simultaneously on the same carrier. For example, a UE may be configured with two TRPs at the same base station in an intra-base station TRP arrangement, or with a first TRP at a serving base station and second TRP as a neighbor base station in an inter-cell multi-TRP arrangement.

Figure 4:
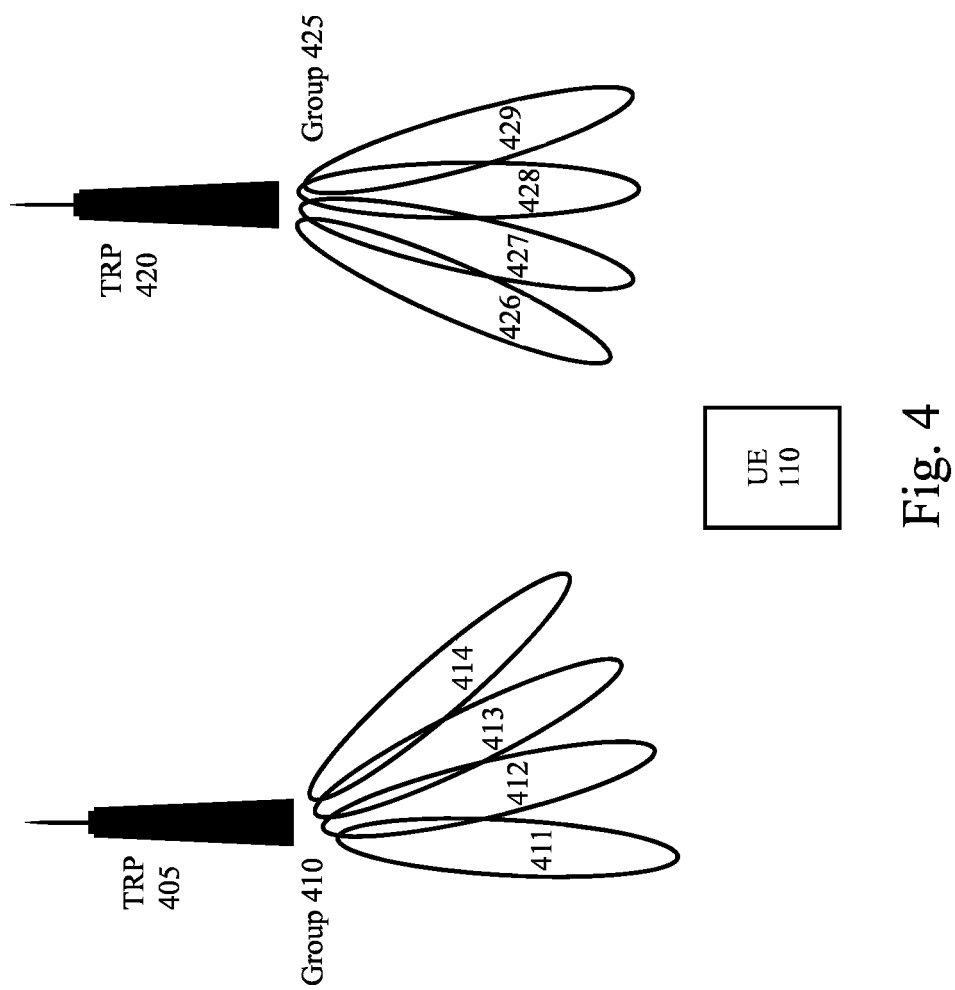
FIG. 4 illustrates an example of a channel state information reference signal (CSI-RS) group pair according to various exemplary embodiments.

A group of reference signals may refer to a group of channel state information reference signals (CSI-RS), a group of synchronization signal blocks (SSBs) or a group of any other appropriate type of reference signals. FIG. 4 illustrates an example of a CSI-RS group pair. In this example, a first TRP 405 performs a sweep using a first group of CSI-RS 410 that includes CSI-RS 411-414 and a second TRP 420 performs a sweep using a second group of CSI-RS 425 that includes CSI-RS 426-429. The first group of CSI-RS 410 and the second group of CSI-RS 425 are associated with one another to form a group pair. As will be described in more detail below, in this type of scenario, the UE 110 may collect measurement data corresponding to each group 410, 425. The UE 110 may then select one of CSI-RS 411-414 from the first group 410 and one of CSI-RS 426-429 from the second group 425. Subsequently, the first TRP 405 may be configured to provide the UE 110 with downlink data using a beam corresponding to the CSI-RS selected from the first group 410 and the second TRP 420 may be configured to provide the UE 110 with downlink data using a beam corresponding to the CSI-RS selected from the second group 425.

In the current specification, group based reporting is used to support UE simultaneous reception over multiple beams. TS 38.214 specifies that, if the UE is configured with the higher layer parameter groupBasedBeamReporting set to 'enabled,' the UE is not required to update measurements for more than 64 channel state information (CSI) reference signals (CSI-RS) and/or synchronization signal (SS) block (SSB) resources, and the UE shall report in a single reporting instance two different CSI-RS resource indicators (CRI) or SSB resource indicators (SSBRI) for each report setting, where CSI-RS and/or SSB resources can be received simultaneously by the UE either with a single spatial domain receive filter or with multiple simultaneous spatial domain receive filters.

The UE may indicate whether it supports group based reporting or not, and this may serve as an indirect indication of whether the UE supports simultaneous reception with different beams or not. In Rel-16, multi-TRP operation is allowed in which the UE can be served by two TRP simultaneously. For more efficient beam management, it is desirable to allow the UE to report measurements for independent beams for each TRP. However, by the end of Rel-16, no enhancement has been introduced for multi-TRP L1-RSRP or L1-SINR reporting.

In Rel-17, FeMIMO (Further Enhanced MIMO) an objective is enhancing L1-RSRP and L1-SINR reporting for multi-TRP operation. Multi-TRP operation may allow two TRPs to transmit to the UE at the same time with the same beam, which requires the UE to receive different beams from different TRPs simultaneously. This requires an enhancement to the group based beam reporting so that the gNB can differentiate between TRPs.

The exemplary embodiments described herein provide operations to support group based beam reporting for L1-RSRP and L1-SINR. According to the exemplary embodiments described herein, a gNB configures one or more CSI reports for measurements performed on each of the TRPs so that the gNB can differentiate resources from different TRP. In some exemplary embodiments, a single CSI-ReportConfig is used for group based beam reporting of L1-RSRP and/or L1-SINR from multiple TRPs. In other exemplary embodiments, two CSI-ReportConfig are used for group based beam reporting of L1-RSRP and/or L1-SINR from multiple TRPs. In still other embodiments, operations for multi-TRP with multi-panel support are described.

Single CSI-ReportConfig

In a first exemplary embodiment, a single CSI report is configured so that the gNB can differentiate resources sent from different TRPs in the UE measurement report. As will be described in further detail below, a second TRP may be introduced into the UE configuration either implicitly, e.g., by configuring two sets of resources, wherein each set corresponds to one of the TRPs, or explicitly, e.g., with a TRP index. The UE may generally be configured with at least one (but potentially all three) of the following CSI measurement resources for a given TRP: channel measurement resource (CMR), zero-power interference measurement resource (ZP-IMR) and non-zero-power (NZP) IMR (NZP-IMR).

Figure 5:
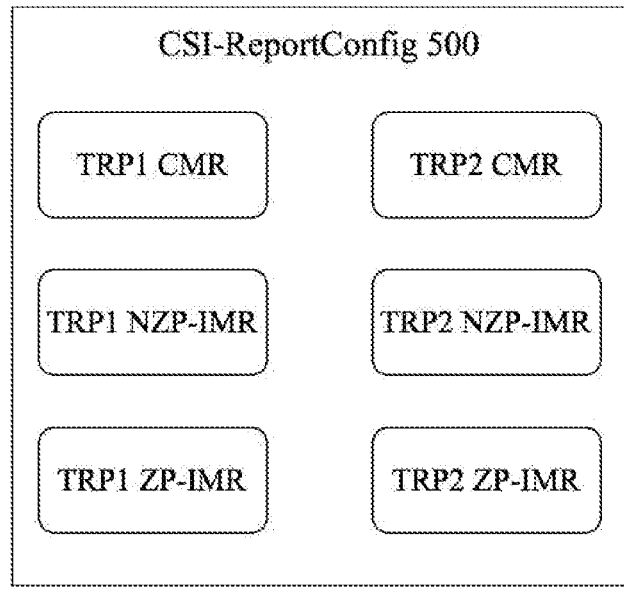
FIG. 5 shows a diagram for a CSI report configuration comprising RS resources for multiple TRPs according to various exemplary embodiments.

FIG. 5 shows a diagram for a CSI report configuration 500 comprising RS resources for multiple TRPs. As shown in FIG. 5, the CSI-ReportConfig 500 includes a CMR for each of the two TRPs, i.e., TRP1 CMR and TRP2 CMR, a NZP-IMR for each of the two TRPs, i.e., TRP1 NZP-IMR and TRP2 NZP-IMR, and a ZP-IMR for each of the two TRPs, i.e., TRP1 ZP-IMR and TRP2 ZP-IMR. The measurement resources may be used by the UE for performing channel measurements on RS such as non-zero-power CSI reference signal (NZP-CSI-RS), SSB or CSI Interference Measurements (CSI-IM).

The following four options may be used to configure the UE for measuring, selecting and reporting measurements for multiple TRPs in a single CSI report configuration, e.g., CSI-ReportConfig.

In a first option, the RS resources for different TRPs are configured at the CSI report level, e.g., CSI-ReportConfig. In the first option, in a single CSI-ReportConfig, two lists of RS resources are configured for the UE, each of the lists corresponding to a different TRP.

The CSI-ReportConfig may further indicate to the UE to choose one beam from each set of resources to select for reporting to the gNB. In this option, the TRP is not explicitly indicated. However, by configuring the UE to select a beam from a resource from each of the lists, the gNB implicitly indicates the different TRPs to the UE and categorizes the TRPs at the CSI-ReportConFIG level.

In a second option, the RS resources are configured at the resource configuration level, e.g., CSI-ResourceConfig. The CSI resource configuration is associated with the CSI report configuration, e.g., CSI-ReportConfig. In a single CSI-ResourceConfig, two lists comprising RS resource parameters can be configured for the UE, wherein each of the lists corresponds to a different TRP.

The resources that may be configured at the CSI-ResourceConFIG level are a nzp-CSI-RS-SSB (a CSI-RS resource set and/or an SSB resource set) (for CMR or NZP-IMR) and a csi-IM-ResourceSetList (for ZP-IMR). The nzp-CSI-RS-SSB may be used as a CMR for one of the TRPs and as an IMR for the other one of the TRPs. Thus, the resource set configured on the first list (for the first TRP, as e.g., a CMR) may be duplicated on the second list (for the second TRP, as e.g., an IMR).

For the nzp-CSI-RS-SSB, in one option, only the CSI-RS resource set (NZP-CSI-RS-ResourceSetList) may be duplicated. In another option, both the CSI-RS resource set and the SSB resource set (CSI-SSB-ResourceSetList) may be duplicated.

In a third option, a TRP index is introduced at the resource set level, i.e., a TRP index is introduced in the configuration of NZP-CSI-RS-ResourceSet, CSI-IM-ResourceSet, and/or CSI-SSB-ResourceSet. Based on the TRP index, the UE can choose a beam from each TRP to select and report to the gNB.

In a fourth option, a TRP index is introduced at the resource level, i.e., TRP index is introduced in the configuration of NZP-CSI-RS-Resource and CSI-IM-Resource.

When the TRP index is introduced for the resource configuration for CSI reporting, as in options three and four above, the TRP index can be introduced as CORESETPoolIndex, wherein the index is RRC configured per CORESET, or PCI (Physical Cell ID).

In a fifth option, the RRC layer explicitly configures one or multiple pairs of NZP-CSI-RS-Resource for group based reporting. The UE is allowed to report only one or multiple of the configured pairs.

IMR Configuration

In a single CSI-ReportConfig, when different reference signal (RS) resources are configured for different TRP for CMR, the IMR may be configured in the following ways.

For the NZP-IMR, a first option is for only one group of NZP-IMR resources to be configured, which applies to both TRPs. A second option is for two groups of NZP-IMR resources to be configured, wherein each group maps to one TRP. For each of the groups, it may be required that the same number of NZP-IMR resources are configured, or different numbers of NZP-IMR resources may be allowed to be configured for each group.

For the ZP-IMR (CSI-IM), a first option is for only one group of ZP-IMR resources to be configured, which applies to both TRP. It may be required that only one ZP-IMR resource can be configured in the group, or more than one ZP-IMR resource may be allowed to be configured in the group. In a second option, two groups of NZP-IMR resources may be configured, each group mapping to one TRP. For each of the groups, it may be required that the same number of ZP-IMR resources are configured, or different numbers of ZP-IMR resources may be allowed to be configured for each group.

The embodiments described above relate to RS measurement, beam selection and reporting configurations. According to the following embodiments UE interference measurement behavior is specified.

The following embodiments are described with respect to the exemplary configuration described above with respect to FIG. 5, wherein a CMR, an NZP-IMR and a ZP-IMR are configured for each of two TRPs, e.g., TRP1 CMR and TRP2 CMR, TRP1 NZP-IMR and TRP2 NZP-IMR, and TRP1 ZP-IMR and TRP2 ZP-IMR, are configured in a single CSI-Report Config. Certain ones of the configured RS resources may be considered during interference testing during CSI computation for a TRP and reporting to the gNB.

In a first option, only the NZP-IMR and ZP-IMR configured for a targeted TRP are measured and considered as interference measurements for CSI computation. That is, for the first TRP (TRP1), only TRP1 NZP-IMR and TRP1 ZP-IMR are used. For the second TRP (TRP2), only TRP2 NZP-IMR and TRP2 ZP-IMR are considered.

In a second option, the NZP-IMR and the ZP-IMR configured for both TRPs are measured and used as interference measurements for CSI computation. That is, for both TRPs (TRP1 and TRP2), the set of TRP1 NZP-IMR, TRP2 NZP-IMR, TRP1 ZP-IMR and TRP2 ZP-IMR are considered.

In a third option, the NZP-IMR and ZP-IMR configured for both TRPs and the CMR configured for the other TRP is computed and reported to the targeted TRP as interference. That is, for the first TRP, the first and second NZP-IMRs, the first and second ZP-IMRs, and the second CMR are considered. For the second TRP, the first and second NZP-IMRs, the first and second ZP-IMRs, and the first CMR are considered.

Two CSI-Report Config

In a second exemplary embodiment, more than one CSI report is configured so that the gNB can differentiate resources sent from different TRPs in the UE measurement report. Each CSI-ReportConfig can contain independent CMR and IMR configurations. Both of the CSI-ReportConfig are configured with either "L1-RSRP" or "L1-SINR" reporting.

One or more of the following restrictions may be imposed. A first restriction is that the same number of NZP-CSI-RS for CMR is configured per CSI-ReportConfig. A second restriction is that the same number of NZP-CSI-RS for NZP-IMR is configured per CSI-ReportConfig. A third restriction is that the same number of CSI-IMR for ZP-IMR is configured per CSI-ReportConfig. A fourth restriction is that the same number of ports, i.e., either 1 or 2, is configured for NZP-CSI-RS.

The two CSI-ReportConfig may be associated together, either explicitly or implicitly, so that the UE knows to consider the configured RS resources as a group. The association informs the UE that to determine (1) CSI-RS resource indicator (CRI) (2) SSB resource indicator (SSBRI) (3) RSRP or SINR measurement results for a particular CSI-ReportConfig, the UE should jointly consider resource measurements from other CSI-ReportConfig. For example, for a CRI selected from the first CSI-ReportConfig, the UE should consider, as interference, the CMR, the NZP-IMR and the ZP-IMR from the second CSI-ReportConfig.

Multi-TRP with Multi-Panel Support

The exemplary embodiments described above may be extended to include support of multi-TRP with multi-panel. That is, each of the TRP may include multiple panels, each panel being configured to transmit a group of resources for L1-RSRP or L1-SINR group reporting.

Figure 6:
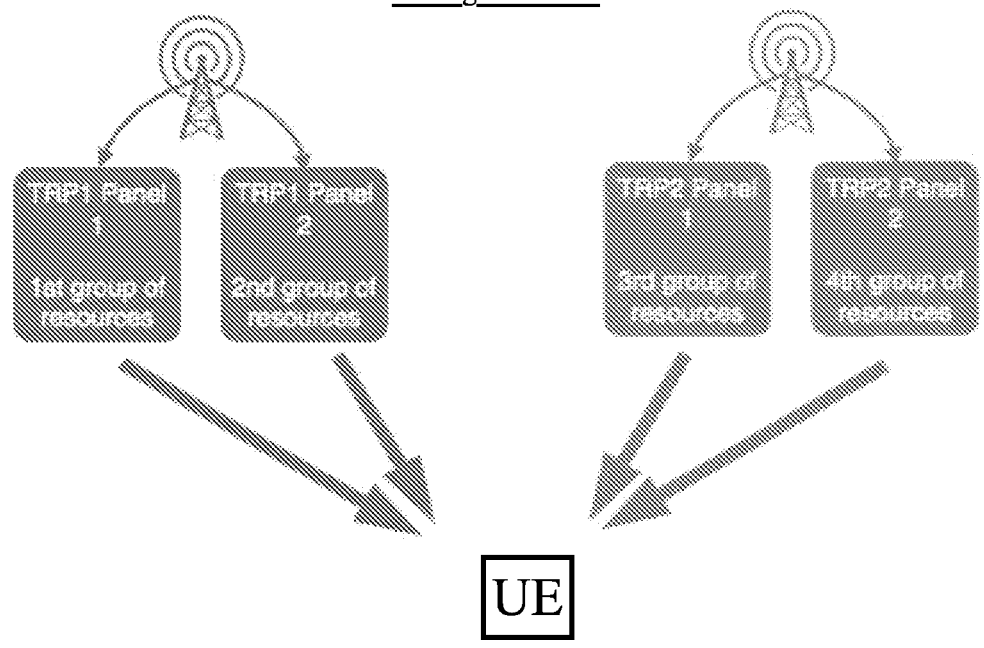
FIG. 6 shows a multi-TRP multi-panel arrangement for CSI group reporting according to various exemplary embodiments.

FIG. 6 shows a multi-TRP multi-panel arrangement 600 for CSI group reporting. The arrangement 600 includes a first TRP (TRP1) having two panels, wherein the first panel (TRP1 Panel 1) transmits a first group of resources and the second panel (TRP1 Panel 2) transmits a second group of resources. The arrangement 600 further includes a second TRP (TRP2) having two panels, wherein the first panel (TRP2 Panel 1) transmits a third group of resources and the second panel (TRP2 Panel 2) transmits a fourth group of resources.

Any of the following can be configured for L1-RSRP and L1-SINR group reporting: RS resources for measurement, RS resource sets for measurement and CSI reports.

For group based reporting, when X groups of the resources are configured and the groups map to different panels in different TRP (X>1), the following options are available for UE group based reporting.

In a first option, the UE can report multiple pairs of beams (CRI or SSBRI), wherein for each pair, for each entry, the UE chooses one beam (CRI or SSBRI) from one group of resources. The UE cannot choose beams from the same group of resources in a different entry in the same pair. Each pair may choose beams from different groups.

Figures 7A, 7B, 7C:
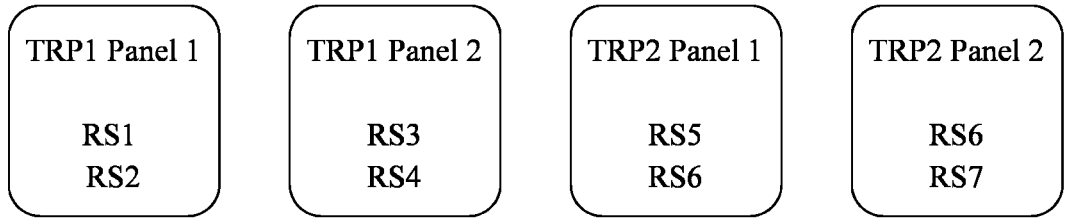
FIG. 7a shows an exemplary RS transmission configuration for the arrangement of FIG. 6 according to various exemplary embodiments.
FIG. 7b shows a diagram for allowed beam pairings according to a first option according to various exemplary embodiments.
FIG. 7c shows a diagram for allowed beam pairings according to a second option according to various exemplary embodiments.

FIG. 7a shows an exemplary RS transmission configuration for the arrangement 600 of FIG. 6. As shown in FIG. 7, TRP1 Panel 1 transmits RS1 and RS2. TRP1 Panel 2 transmits RS3 and RS4. TRP2 Panel 1 transmits RS5 and RS6. TRP2 Panel 2 transmits RS7 and RS8.

According to the first option, the UE cannot pair beams transmitted from the same TRP and same panel. Thus, as shown in the diagram of FIG. 7b, a pairing of RS1 and RS2 is not allowed. However, for example, a pairing of RS1 and RS3, RS1 and RS6, or RS3 and RS7 is allowed.

In a second option, the UE can report M<=X groups of beams. Within each group of reported beams, multiple beams can be reported from different groups of resources configured for the UE to measure. A beam from the same group of resources configured for the UE to measure cannot be reported in a different group of reported beams.

According to the second option, the UE cannot include in the group beam pairing an RS transmitted from the same TRP and same panel. Thus, as shown in the diagram of FIG. 7c, a group pairing of RS1 and RS3 with RS2 and RS5 is not allowed, because RS1 and RS2 (transmitted from TRP1 Panel 1) are paired. However, beams transmitted from the same TRP and same panel can be included in a group, which is paired with another group of UE. Thus, for example, RS3 and RS4 may be grouped and paired with RS2 and RS6.

EXAMPLES

In a first example, a base station having a transceiver configured to communicate with a user equipment (UE) and a processor communicatively coupled to the transceiver and configured to perform operations is provided. The operations include configuring the UE for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, wherein the UE is further configured to select a first beam from the first plurality of beamformed RS and a second beam from the second plurality of beamformed RS and receiving the at least one CSI measurement report comprising measurements for the first beam and the second beam.

In a second example, the base station of the first example, wherein the first and the second RS resources comprise one or more of a channel measurement resource (CMR), a non-zero power (NZP) interference measurement resource (IMR) (NZP-IMR) or a zero-power (ZP) IMR (ZP-IMR).

In a third example, the base station of the second example, wherein the first and second RS resources carry one or more of a non-zero power channel state information reference signal (NZP-CSI-RS), a synchronization system block (SSB) or a CSI interference measurement (CSI-IM).

In a fourth example, the base station of the second example, wherein two lists of RS resources are configured for the UE in a single CSI-ReportConfig, wherein a first list corresponds to the first RS resources and a second list corresponds to the second RS resources.

In a fifth example, the base station of the second example, wherein two lists of RS resources are configured for the UE in a single CSI-ResourceConfig, wherein a first list corresponds to the first RS resources and a second list corresponds to the second RS resources.

In a sixth example, the base station of the fifth example, wherein the two lists comprise configurations for at least one of nzp-CSI-RS-SSB for CMR or NZP-IMR and csi-IM-ResourceSetList for ZP-IMR.

In a seventh example, the base station of the sixth example, wherein a nzp-CSI-RS-ResourceSetList in the first list is duplicated in the second list as a NZP-IMR.

In an eighth example, the base station of the seventh example, wherein a nzp-SSB-ResourceSetList in the first list is duplicated in the second list as a NZP-IMR.

In a ninth example, the base station of the second example, wherein a TRP index is indicated at a resource set level to indicate a NZP-CSI-RS-ResourceSet, a CSI-IM-ResourceSet, or a CSI-SSB-ResourceSet corresponding to either the first TRP or the second TRP.

In a tenth example, the base station of the second example, wherein a TRP index is indicated at a resource level to indicate a NZP-CSI-RS-Resource or a CSI-IM-Resource corresponding to either the first TRP or the second TRP.

In an eleventh example, the base station of the second example, wherein a TRP index is indicated for a RS resource via CORESETPoolIndex or a physical cell ID.

In a twelfth example, the base station of the second example, wherein the operations further comprise configuring multiple pairs of NZP-CSI-RS-Resource for group based reporting via radio resource control (RRC) signaling.

In a thirteenth example, the base station of the second example, wherein only one group of NZP-IMR is configured for the UE in a single CSI-ReportConfig, wherein the NZP-IMR group configuration applies for both the first and second TRPs.

In a fourteenth example, the base station of the second example, wherein two groups of NZP-IMR are configured for the UE in a single CSI-ReportConfig, wherein a first NZP-IMR group configuration applies to the first TRP and a second NZP-IMR group configuration applies to the second TRP.

In a fifteenth example, the base station of the second example, wherein only one group of ZP-IMR is configured for the UE in a single CSI-ReportConfig, wherein the ZP-IMR configuration applies for both the first and second TRPs.

In a sixteenth example, the base station of the second example, wherein two groups of ZP-IMR are configured for the UE in a single CSI-ReportConfig, wherein a first ZP-IMR group configuration applies to the first TRP and a second ZP-IMR group configuration applies to the second TRP.

In a seventeenth example, the base station of the second example, wherein a NZP-IMR and a ZP-IMR configured for one of the first or second TRPs is considered for interference testing only on the corresponding first or second TRP.

In an eighteenth example, the base station of the second example, wherein a NZP-IMR and a ZP-IMR configured for each of the first and second TRPs is considered for interference testing on both the first and second TRPs.

In a nineteenth example, the base station of the eighteenth example, wherein a CMR configured for one of the first or second TRPs is also considered for interference testing on the other one of the first or second TRPs.

In a twentieth example, the base station of the second example, wherein a set of RS resources is configured for the UE in each of two CSI-ReportConfig, wherein a first CSI-ReportConfig includes CMR and IMR configurations corresponding to the first TRP and a second CSI-ReportConfig includes CMR and IMR configurations corresponding to the second TRP.

In a twenty first example, the base station of the twentieth example, wherein each of the CSI-ReportConfig is configured with either layer 1 (L1) reference signal received power (RSRP) or L1 signal-to-noise and interference ratio (SINR) (L1-SINR).

In a twenty second example, the base station of the twentieth example, wherein a same number of NZP-CSI-RS is configured for CMR for each CSI-ReportConfig.

In a twenty third example, the base station of the twentieth example, wherein a same number of NZP-CSI-RS is configured for NZP-IMR for each CSI-ReportConfig.

In a twenty fourth example, the base station of the twentieth example, wherein a same number of CSI-IMR is configured for ZP-IMR for each CSI-ReportConfig.

In a twenty fifth example, the base station of the twentieth example, wherein a same number of ports is configured for NZP-CSI-RS for each CSI-ReportConfig.

In a twenty sixth example, the base station of the twentieth example, wherein the two CSI-ReportConfig are associated together explicitly or implicitly.

In a twenty seventh example, the base station of the twenty sixth example, wherein the association informs the UE to consider, for the CSI calculation corresponding to one of the CSI-ReportConfig, at least one of i) the CMR from the other CSI-ReportConfig, ii) the NZP-IMR from the other CSI-ReportConfig, iii) or the ZP-IMR from the other CSI-ReportConfig as interference.

In a twenty eighth example, the base station of the second example, wherein the first and second beam are reported as a beam pair in group-based report.

In a twenty ninth example, the base station of the twenty eighth example, wherein the first TRP and the second TRP are configured with RS resources for multiple panels at each TRP.

In a thirtieth example, the base station of the twenty ninth example, wherein the UE is configured so that the UE cannot pair a beam transmitted from a first panel at one of the first or second TRPs with another beam transmitted from the first panel of the one of the first or second TRPs.

In a thirty first example, the base station of the thirtieth example, wherein the UE reports a group of beams paired with another group of beams.

In a thirty second example, a user equipment (UE) having a transceiver configured to communicate with a base station and a processor communicatively coupled to the transceiver and configured to perform operations is provided. The operations include receiving a configuration from the base station for at least one channel state information (CSI) measurement report including an indication of first reference signal (RS) resources for a first transmission and reception point (TRP) and second RS resources for a second TRP, the first RS resources comprising a first plurality of beamformed RS and the second RS resource comprising a second plurality of beamformed RS to be received simultaneously at the UE, selecting a first beam from the first plurality of beamformed RS and a second beam from the second plurality of beamformed RS and transmitting the at least one CSI measurement report comprising measurements for the first and the second beam.

In a thirty third example, the UE of the thirty first example, wherein the first and second RS resources comprise one or more of a channel measurement resource (CMR), a non-zero power (NZP) interference measurement resource (IMR) (NZP-IMR) or a zero-power (ZP) IMR (ZP-IMR).

In a thirty fourth example, the UE of the thirty third example, wherein the first and second RS resources carry one or more of a NZP-CSI-RS, a synchronization system block (SSB) or a CSI interference measurement (CSI-IM).

In a thirty fifth example, the UE of the thirty third example, wherein two lists of RS resources are configured for the UE in a single CSI-ReportConfig, wherein a first list corresponds to the first RS resources and a second list corresponds to the second RS resources.

In a thirty sixth example, the UE of the thirty third example, wherein two lists of RS resources are configured for the UE in a single CSI-ResourceConfig, wherein a first list corresponds to the first RS resources and a second list corresponds to the second RS resources.

In a thirty seventh example, the UE of the thirty sixth example, wherein the two lists comprise configurations for at least one of nzp-CSI-RS-SSB for CMR or NZP-IMR and csi-IM-ResourceSetList for ZP-IMR.

In a thirty eighth example, the UE of the thirty seventh example, wherein a nzp-CSI-RS-ResourceSetList in the first list is duplicated in the second list as a NZP-IMR.

In a thirty ninth example, the UE of the thirty eighth example, wherein a nzp-SSB-ResourceSetList in the first list is duplicated in the second list as a NZP-IMR.

In a fortieth example, the UE of the thirty third example, wherein a TRP index is indicated at a resource set level to indicate a NZP-CSI-RS-ResourceSet, a CSI-IM-Resource-Set, or a CSI-SSB-ResourceSet corresponding to either the first TRP or the second TRP.

In a forty first example, the UE of the thirty third example, wherein a TRP index is indicated at a resource level to indicate a NZP-CSI-RS-Resource or a CSI-IM-Resource corresponding to either the first TRP or the second TRP.

In a forty second example, the UE of the thirty third example, wherein a TRP index is indicated for a RS resource via CORESETPoolIndex or a physical cell ID.

In a forty third example, the UE of the thirty third example, wherein the operations further comprise receiving a configuration for multiple pairs of NZP-CSI-RS-Resource for group based reporting via radio resource control (RRC) signaling.

In a forty fourth example, the UE of the thirty third example, wherein only one group of NZP-IMR is configured for the UE in a single CSI-ReportConfig, wherein the NZP-IMR group configuration applies for both the first and second TRPs.

In a forty fifth example, the UE of the thirty third example, wherein two groups of NZP-IMR are configured for the UE in a single CSI-ReportConfig, wherein a first NZP-IMR group configuration applies to the first TRP and a second NZP-IMR group configuration applies to the second TRP.

In a forty sixth example, the UE of the thirty third example, wherein only one group of ZP-IMR is configured for the UE in a single CSI-ReportConfig, wherein the ZP-IMR configuration applies for both the first and second TRPs.

In a forty seventh example, the UE of the thirty third example, wherein two groups of ZP-IMR are configured for the UE in a single CSI-ReportConfig, wherein a first ZP-IMR group configuration applies to the first TRP and a second ZP-IMR group configuration applies to the second TRP.

In a forty eighth example, the UE of the thirty third example, wherein a NZP-IMR and a ZP-IMR configured for one of the first or second TRPs is considered for interference testing only on the corresponding first or second TRP.

In a forty ninth example, the UE of the thirty third example, wherein a NZP-IMR and a ZP-IMR configured for each of the first and second TRPs is considered for interference testing on both the first and second TRPs.

In a fiftieth example, the UE of the forty ninth example, wherein a CMR configured for one of the first or second TRPs is also considered for interference testing on the other one of the first or second TRPs.

In a fifty first example, the UE of the thirty third example, wherein a set of RS resources is configured for the UE in each of two CSI-ReportConfig, wherein a first CSI-Report-Config includes CMR and IMR configurations corresponding to the first TRP and a second CSI-ReportConfig includes CMR and IMR configurations corresponding to the second TRP.

In a fifty second example, the UE of the fifty first example, wherein each of the CSI-ReportConfig is configured with either layer 1 (L1) reference signal received power (RSRP) or L1 signal-to-noise and interference ratio (SINR) (L1-SINR).

In a fifty third example, the UE of the fifty first example, wherein a same number of NZP-CSI-RS is configured for CMR for each CSI-ReportConfig.

In a fifty fourth example, the UE of the fifty first example, wherein a same number of NZP-CSI-RS is configured for NZP-IMR for each CSI-ReportConfig.

In a fifty fifth example, the UE of the fifty first example, wherein a same number of CSI-IMR is configured for ZP-IMR for each CSI-ReportConfig.

In a fifty sixth example, the UE of the fifty first example, wherein a same number of ports is configured for NZP-CSI-RS for each CSI-ReportConfig.

In a fifty seventh example, the UE of the fifty first example, wherein the two CSI-ReportConfig are associated together explicitly or implicitly.

In a fifty eighth example, the UE of the fifty seventh example, wherein the association informs the UE to consider, for the CSI calculation corresponding to one of the CSI-ReportConfig, at least one of i) the CMR from the other CSI-ReportConfig, ii) the NZP-IMR from the other CSI-ReportConfig, iii) or the ZP-IMR from the other CSI-ReportConfig as interference.

In a fifty ninth example, the UE of the thirty third example, wherein the first and second beam are reported as a beam pair in group-based report.

In a sixtieth example, the UE of the fifty ninth example, wherein the first TRP and the second TRP are configured with RS resources for multiple panels at each TRP.

In a sixty first example, the UE of the sixtieth example, wherein the UE is configured so that the UE cannot pair a beam transmitted from a first panel at one of the first or second TRPs with another beam transmitted from the first panel of the one of the first or second TRPs.

In a sixty second example, the UE of the sixty first example, wherein the UE reports a group of beams paired with another group of beams.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a base station configured to perform operations comprising:
   generating, for transmission to a user equipment (UE), a CSI-ReportConfig information element (IE), wherein the CSI-ReportConfig IE comprises an indication of group based beam reporting;
   generating, for transmission to the UE, a CSI-ResourceConfig IE, wherein the CSI-ResourceConfig IE comprises a plurality of resource sets for a plurality of transmission and reception points (TRPs), each resource set comprising a plurality of beamformed reference signals (RSS), and wherein the UE is configured to select a first resource set and a second resource set from the plurality of resource sets based on the indication of group based beam reporting in the CSI-ReportConfig IE; and
   receiving a CSI measurement report from the UE, wherein the CSI measurement report is based on the first and the second resource set.

2. The processor of claim 1, wherein the first and the second resource sets comprise one or more of a channel measurement resource (CMR), a non-zero power (NZP) interference measurement resource (IMR) (NZP-IMR) or a zero-power (ZP) IMR (ZP-IMR).

3. The processor of claim 2, wherein the first and the second resource sets carry one or more of a non-zero power channel state information reference signal (NZP-CSI-RS), a synchronization system block (SSB) or a CSI interference measurement (CSI-IM).

4. The processor of claim 2, wherein a TRP index is indicated at a resource set level to indicate a NZP-CSI-RS-ResourceSet, a CSI-IM-ResourceSet, or a CSI-SSB-ResourceSet corresponding to either a first TRP or a second TRP.

5. The processor of claim 2, wherein a TRP index is indicated at a resource level to indicate a NZP-CSI-RS-Resource or a CSI-IM-Resource corresponding to either a first TRP or a second TRP.

6. The processor of claim 2, wherein a TRP index is indicated for a resource set via CORESETPoolIndex or a physical cell ID.

7. The processor of claim 2, wherein the operations further comprise:
   configuring multiple pairs of NZP-CSI-RS-Resource for group based reporting via radio resource control (RRC) signaling.

8. The processor of claim 2, wherein only one group of NZP-IMR is configured for the UE in the CSI-ReportConfig IE, wherein the NZP-IMR group configuration applies for both a first and a second TRPs.

9. The processor of claim 2, wherein two groups of NZP-IMR are configured for the UE in the CSI-ReportConfig IE, wherein a first NZP-IMR group configuration applies to a first TRP and a second NZP-IMR group configuration applies to a second TRP.

10. The processor of claim 2, wherein only one group of ZP-IMR is configured for the UE in the CSI-ReportConfig IE, wherein the ZP-IMR configuration applies for both a first and a second TRPs.

11. The processor of claim 2, wherein two groups of ZP-IMR are configured for the UE in the CSI-ReportConfig IE, wherein a first ZP-IMR group configuration applies to a first TRP and a second ZP-IMR group configuration applies to a second TRP.

12. The processor of claim 2, wherein a NZP-IMR and a ZP-IMR configured for one of a first or a second TRPs is considered for interference testing only on the corresponding first or second TRP.

13. The processor of claim 2, wherein a NZP-IMR and a ZP-IMR configured for each of a first or a second TRPs is considered for interference testing on both the first and second TRPs.

14. The processor of claim 2, wherein a first and a second beam are reported as a beam pair in group-based report.

15. A processor of a user equipment (UE) configured to perform operations comprising:
   process, based on signaling received from a base station, a CSI-ReportConfig information element (IE), wherein the CSI-ReportConfig IE comprises an indication of group based beam reporting;
   process, based on signaling received from the base station, a CSI-ResourceConfig IE, wherein the CSI-ResourceConfig IE comprises a plurality of resource sets for a plurality of transmission and reception points (TRPs), each resource set comprising a plurality of beamformed reference signals (RSS);
   selecting a first resource set and a second resource set from the plurality of resource sets based on the indication of group based beam reporting in the CSI-ReportConfig IE; and
   generating, for transmission to the base station, a CSI measurement report, wherein the CSI measurement report is based on the first and the second resource set.

16. The processor of claim 15, wherein the first and the second resource sets comprise one or more of a channel measurement resource (CMR), a non-zero power (NZP) interference measurement resource (IMR) (NZP-IMR) or a zero-power (ZP) IMR (ZP-IMR).

17. The processor of claim 16, wherein the first and the second resource sets carry one or more of a NZP-CSI-RS, a synchronization system block (SSB) or a CSI interference measurement (CSI-IM).

* * * * *